US008555367B2

(12) United States Patent
Syed et al.

(10) Patent No.: US 8,555,367 B2
(45) Date of Patent: Oct. 8, 2013

(54) METHOD AND SYSTEM FOR SECURELY STREAMING CONTENT

(75) Inventors: Omar Syed, Murphy, TX (US); Bhargavaram B. Gade, Irving, TX (US); Robert Ames, Irving, TX (US); Ghousuddin Syed, Richardson, TX (US); Karl Juhnke, Garland, TX (US); Mark Ray Lee, Richardson, TX (US); Vinay Polavarapu, Irving, TX (US); Sastry Anipindi, Irving, TX (US); Alex Khanin, Richardson, TX (US)

(73) Assignee: Yahoo! Inc., Sunnyvale, CA (US)

( * ) Notice: Subject to any disclaimer, the term of this patent is extended or adjusted under 35 U.S.C. 154(b) by 998 days.

(21) Appl. No.: 12/047,112

(22) Filed: Mar. 12, 2008

(65) Prior Publication Data

US 2009/0235347 A1 Sep. 17, 2009

(51) Int. Cl.
*G06F 7/04* (2006.01)

(52) U.S. Cl.
USPC ............................................. 726/10; 726/29

(58) Field of Classification Search
USPC ........... 726/2–10, 26–30; 713/150, 155–157, 713/168, 181
See application file for complete search history.

(56) References Cited

U.S. PATENT DOCUMENTS

| | | | | |
|---|---|---|---|---|
| 6,510,464 B1 * | 1/2003 | Grantges et al. | ............... | 709/225 |
| 7,234,158 B1 * | 6/2007 | Guo et al. | ........................... | 726/2 |
| 7,500,262 B1 * | 3/2009 | Sanin et al. | ........................ | 726/2 |
| 7,685,206 B1 * | 3/2010 | Mathew et al. | ............... | 707/785 |
| 7,685,631 B1 * | 3/2010 | Paya et al. | ........................ | 726/8 |
| 8,051,491 B1 * | 11/2011 | Cavage et al. | .................. | 726/30 |
| 2002/0147929 A1 * | 10/2002 | Rose | .............................. | 713/201 |
| 2003/0046589 A1 * | 3/2003 | Gregg | ............................ | 713/201 |
| 2003/0061512 A1 * | 3/2003 | Flurry et al. | .................. | 713/201 |
| 2003/0093667 A1 * | 5/2003 | Dutta et al. | ..................... | 713/161 |
| 2003/0163684 A1 * | 8/2003 | Fransdonk | ..................... | 713/153 |
| 2003/0172269 A1 * | 9/2003 | Newcombe | .................... | 713/168 |
| 2003/0188193 A1 * | 10/2003 | Venkataramappa | .......... | 713/201 |
| 2003/0217288 A1 * | 11/2003 | Guo et al. | ....................... | 713/201 |
| 2004/0006542 A1 * | 1/2004 | Gilliam et al. | .................. | 705/51 |
| 2004/0006693 A1 * | 1/2004 | Vasnani et al. | ................ | 713/168 |
| 2004/0054750 A1 * | 3/2004 | de Jong et al. | ................ | 709/217 |
| 2004/0088576 A1 * | 5/2004 | Foster et al. | ................... | 713/201 |
| 2004/0148410 A1 * | 7/2004 | Howard et al. | ............... | 709/229 |
| 2004/0162787 A1 * | 8/2004 | Madison et al. | ................ | 705/64 |
| 2004/0210756 A1 * | 10/2004 | Mowers et al. | ............... | 713/168 |
| 2005/0050317 A1 * | 3/2005 | Kramer et al. | ................ | 713/155 |
| 2005/0074126 A1 * | 4/2005 | Stanko | ........................... | 380/279 |
| 2005/0149723 A1 * | 7/2005 | Watkins et al. | ............... | 713/156 |
| 2006/0048213 A1 * | 3/2006 | Cheng et al. | ...................... | 726/5 |
| 2006/0080545 A1 * | 4/2006 | Bagley | ........................... | 713/183 |
| 2007/0192843 A1 * | 8/2007 | Peterson et al. | ................ | 726/10 |

* cited by examiner

Primary Examiner — Darren B Schwartz
(74) Attorney, Agent, or Firm — James J. DeCarlo; Greenberg Traurig, LLP (57) ABSTRACT

A system and method for securely streaming media. The system includes a gateway server that receives requests for access to a secured data resource from an end users. The request include an authorization ticket and a referring website. The gateway server validates the authorization ticket using a secret key shared with the referring website, and validates the referring website by verifying that referring website is on a white-list for the secured data resource. The gateway server selects a data server to service the request, and formats a data server access request containing the data server location and data server request parameter data and transmits the data server access request to the end users. When end users transmit the data server access requests to a data server, the data server validates the request and transmits it to the end user.

52 Claims, 8 Drawing Sheets

METHOD AND SYSTEM FOR SECURELY STREAMING CONTENT

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for securing the transmission of data over the Internet and more particularly, to systems and methods for securing multimedia data distributed to end users using streaming protocols.

BACKGROUND OF THE INVENTION

A multimedia provider can provide multimedia content owned by the provider or the provider's partners for consumption by interested consumers over the Internet using data streaming protocols. Ideally, this content should only be displayed through channels or secure access points controlled or authorized by the multimedia provider. Unfortunately, it is often possible to bypass approved channels and still display the content.

SUMMARY OF THE INVENTION

In one embodiment, the invention is directed to a method that includes the following steps. A request for access to a secured data resource is received from an end user. The request includes an authorization ticket and a referring website. The authorization ticket and the referring website are validated. A data server is selected to service the request, and a data server access request is formatted. The data server access includes a data server location and data server request parameter data comprising an identifier for the secured data resource. The data server access request is then transmitted to the end user.

In another embodiment, the invention is directed to a computer-readable medium having computer-executable instructions for a method which includes the following steps. A request for access to a secured data resource is received from an end user. The request includes an authorization ticket and a referring website. The authorization ticket and the referring website are validated. A data server is selected to service the request, and a data server access request is formatted. The data server access includes a data server location and data server request parameter data comprising an identifier for the secured data resource. The data server access request is then transmitted to the end user.

In yet another embodiment, the invention is directed to a system comprising a a gateway server operatively connected to an end user. The gateway server includes a receiving module that receives requests for access to a secured data resource from an end user, such request including an authorization ticket and a referring website. The gateway server also includes a validation module that validates the authorization ticket and the referring website, a selection module that selects a data server to service the request, and a request formatting module that formats a data server access request. The data server access request includes a data server location and data server request parameter data including an identifier for the secured data resource. The gateway server also includes a transmission module that transmits the data server access request to the end user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

The present invention is described below with reference to block diagrams and operational illustrations of methods and devices to store and/or access streaming media. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure the term "stream" and "data stream" should be understood to refer to a stream of binary data between a data source and a data consumer. The data can be consumed as it is received by the data consumer (i.e. "real-time" or "near time", or can be stored for later consumption. The stream can be continuous, or subject to period interruption. By way of example, and not limitation, the term "stream" and "data stream" can refer to a stream of media content, such as music, video, or audio video data. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules.

Reference will now be made in detail to illustrative embodiments of the present invention, examples of which are shown in the accompanying drawings.

Figure 1:
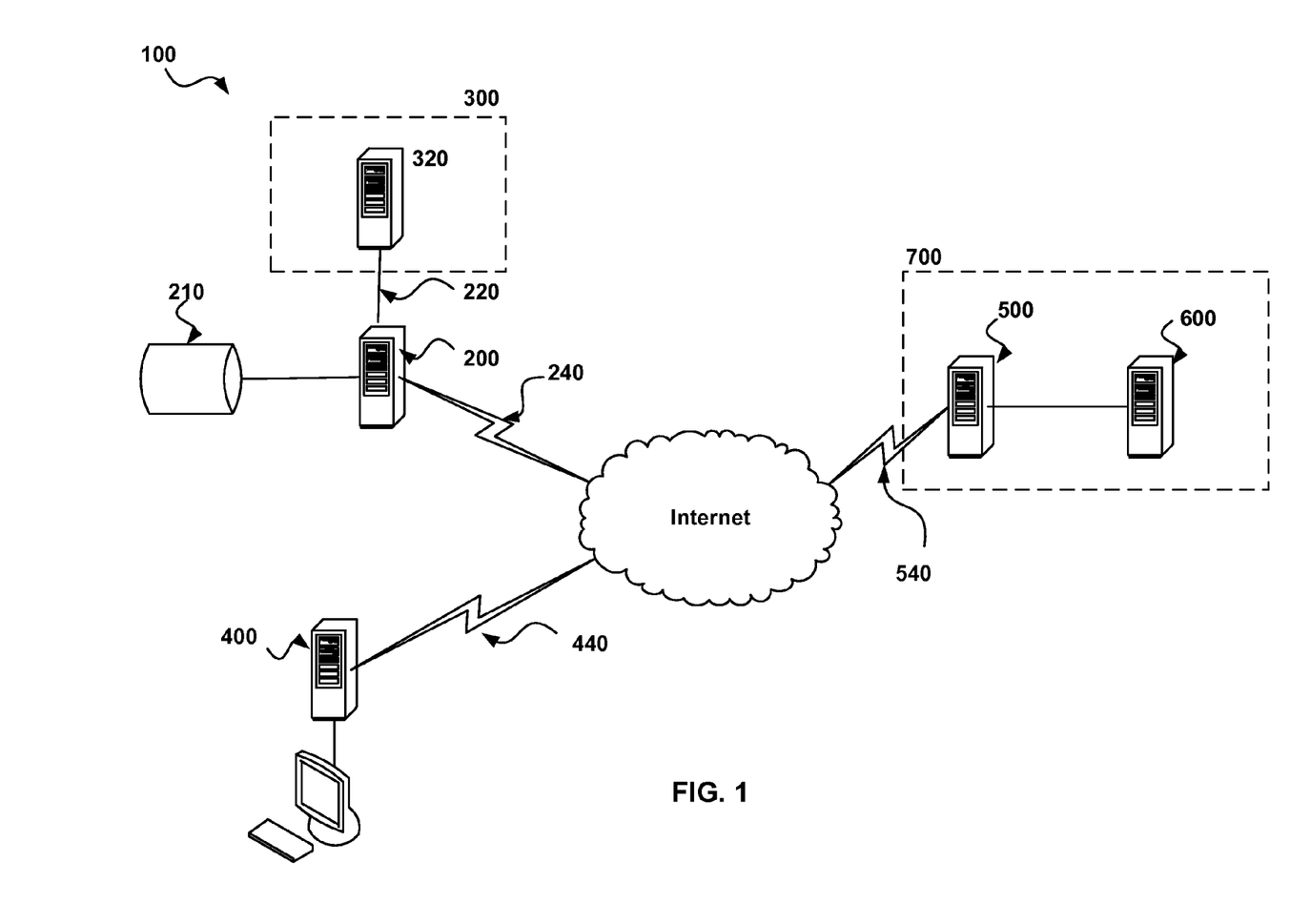
FIG. 1 illustrates one embodiment of a physical system for distributing streamed media to end user systems.

FIG. 1 illustrates one embodiment of a physical system 100 for distributing streamed media to end user systems 400. Media can be stored on a storage device 210 of a provider's media or data server 200. The media server 200 can also retrieve media from a partner 300 having at least one data server through a network connection 220 on an as-needed basis. The media server 200 is capable of communicating with, and transferring data to an end user system 400 over a network connection 240 and 440 which can be hosted in part on an external network such as the Internet. Such data can comprise, for example, a media clip the end user system has requested.

The embodiment in FIG. 1 additionally comprises an advertising server 500. In the illustrated embodiment, the end user system can request a media clip from the advertising server 500. The request can be formatted by an end user application, for example, a web browser plug-in on the end user system and can be transmitted to the advertising server 500 over the network connection 240 and 540. The advertising server 500 can associate additional media clips, such as advertisements for a third party product, with the requested media clip, and can perform additional advertising or revenue generating functions, such as charging a third party for displaying the party's advertisement. The advertising server can then transmit a playlist request (a request to map a media clip to a stream on a media server) to a playlist server 600 for each clip to be provided to the end user system 400.

The playlist server 600 associates each playlist request with a specific data stream available on a media server 200 and transmits the data stream information back to the advertising server 500 over the network connection 520. The advertising server can then transmit the data stream information to the end user system 400 over the network connection 240 and 540. The end user system 400 can then use the data stream information received from the advertising server 500 to request data streams containing the requested clip and associated advertisements, if any, directly from a media server 200 over the network connection 220 and 420. The media server then delivers the requested data streams to the end user system over the network connection 220 and 420.

The advertising server 500 and the playlist server 600 can be collectively referred to as gateway servers 700. While the embodiment shown in FIG. 1 implies that end user systems 400 communicate exclusively with advertising servers 500, in alternative embodiments, the end user systems 400 could communicate directly with playlist servers 600. In yet other embodiments, advertising server functions and the playlist server functions could be consolidated in a single server. The term gateway server should be broadly construed to be a server which provides data access information to end user systems.

Figure 2:
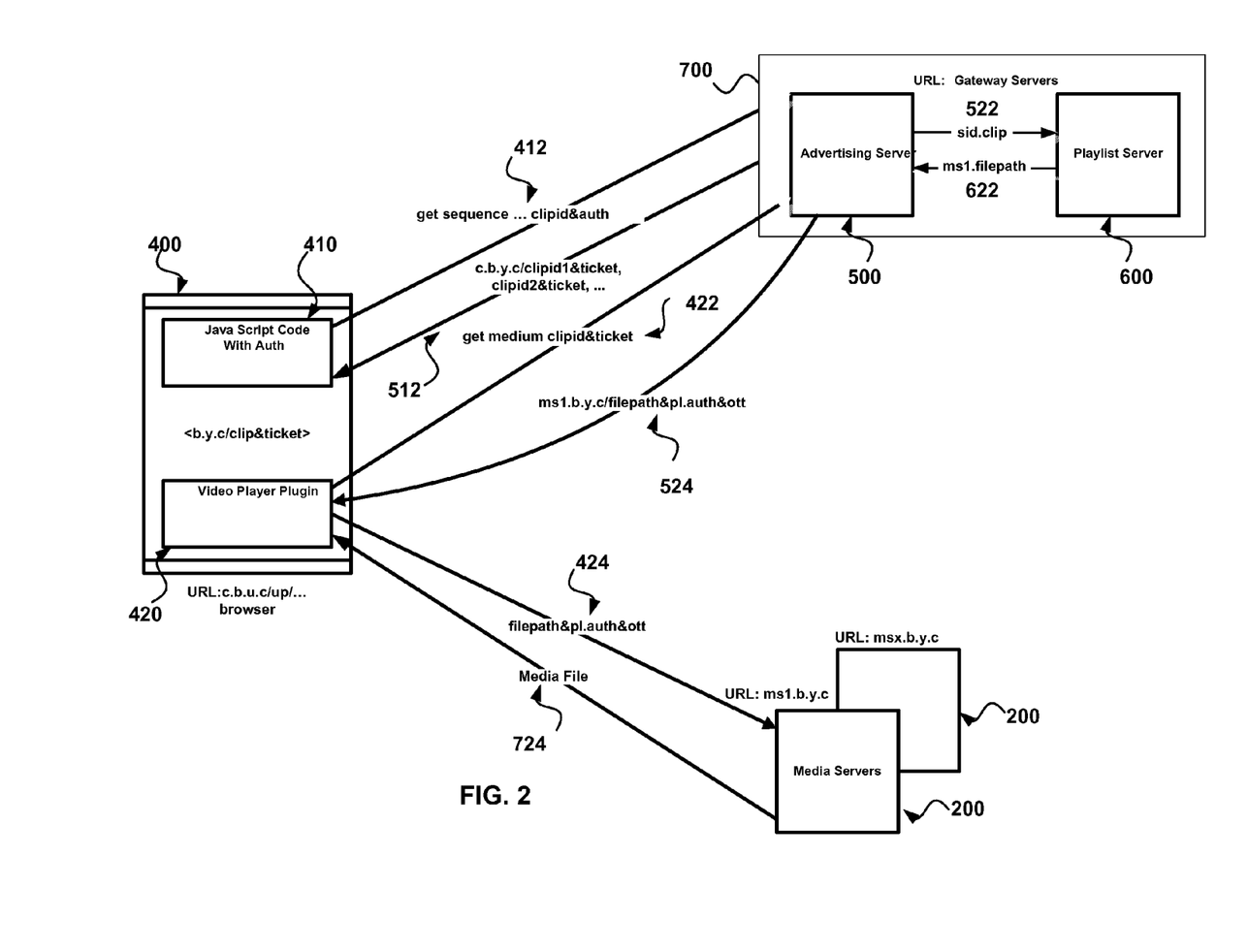
FIG. 2 illustrates one embodiment of a system for providing improved security in the delivery of media over a physical system for data delivery such as that illustrated in FIG. 1.

FIG. 2 illustrates one embodiment of a system for providing improved security in the delivery of media over a physical system for data delivery such as that illustrated in FIG. 1. Those skilled in the art will appreciate that the system illustrated in FIG. 2 can, however, be implemented on a variety of hardware and network configurations, and nothing in this disclosure should be construed as limiting the implementation of the system to the illustrated embodiment.

The system can be implemented such that requests for media clips or files are initially presented to a gateway servers 700, such an advertising server 500 or playlist server 600, where content security requirements can be enforced. In the embodiment in FIG. 2, an authorized Java script 410 on the end user system 400 presents a request 412 for a clip ID to the advertising server 500. The advertising server 410 validates the request 412 and returns a list of clips 512 with authorization tickets to the Java application 410. The clips can include the requested clips and can include additional clips such as advertisements. A video player plugin 420 can then use the clip IDs and tickets 512 to issue requests 422 for media streams to the advertising server 500.

The advertising server in turn passes the requests 522 to a playlist server that maps the requests to specific media servers 200 and returns a list of media server access requests 622 to the advertising server 500, which in turn communicates the list 524 to the video player plug-in 420 on the end user system 400. The returned media server access requests 524 can include authorization tickets and additional parameters such as, for example, a one-time-ticket ("ott") (discussed more fully below.) The end user system 400 can then use the media server access requests 524 to issue requests 424 for media from a media server 200, which then delivers the requested content 724 to the to the video player plug-in 420 on the end user system 400.

While the embodiment shown in FIG. 2 implies that a request for media proceeds in two phases, wherein the first phase the end user system requests a single clip 412 and receives a list of clips 512 in return and in the second phase the end user system uses the list of clips 422 to retrieve media server access requests 524, it should be understood that the request could proceed in one phase. For example, in an alternative embodiment, an end user process could format a request for a media clips 422 and receive server access requests 524 without using performing the intermediate step of retrieving a list of clips 512 from the advertising server.

Furthermore, while the embodiment shown in FIG. 2 implies that end user systems 400 communicate exclusively with advertising servers 500, in alternative embodiments, the end user systems 400 could communicate directly with playlist servers 600. In yet other embodiments advertising server functions and the playlist server functions could be consolidated in a single server. In the examples that follow, the term "gateway server" will be used to refer to the functions collectively embodied within advertising and gateway servers as discussed above.

In one embodiment, gateway servers can store a "whitelist" which comprises a list of websites authorized to request specific media clips or categories of media clips. In another embodiment, a white-list can be maintained on a separate server, or, at a minimum, on separate domains. For example, a white-list server can be implemented as a set of at least two hosts in at least two geographically distributed locations made accessible under a single domain name, such as: whitelist.bcst.yahoo.com.

In one embodiment, when an end user system requests access to a media clip, an HTTP request is formatted by application software located on an end user system, for example, a browser based application, or a media player. Two examples of such HTTP requests to a gateway server are as follows:

http://gateway.bcst.yahoo.com/getMediaLink.php?aid=382884 http://gateway.bcst.yahoo.com/getMediaLink.php?fid=4837722

The first example requests an asset ID ("aid") such as node ID or media clip ID; the second example requests a file ID ("fid"). When an media clip ID is given, additional parameters specifying bandwidth and media player technology on the end user system can be provided. If additional parameters are not provided, then the Q cookie can be used to determine user settings.

When a gateway server receives the request, the gateway server can determine if the request has originated from an authorized source on the provider's white-list for the media clip or file. If the request does not originate from an authorized source, it is rejected. The origin of an HTTP request to a gateway server can be determined, for example, by using the Referrer header field of the HTTP request common unmodified browser software is being used. If request is made by the media player and uses a protocol like MMS or RTSP, the request will contain a Referrer field if common unmodified media player software is being used. Gateway servers can implement additional security checks for improved security in addition to a server white-list. For example, the system can additionally require an authentication ticket to be passed on the initial request to the gateway server.

Figure 3:
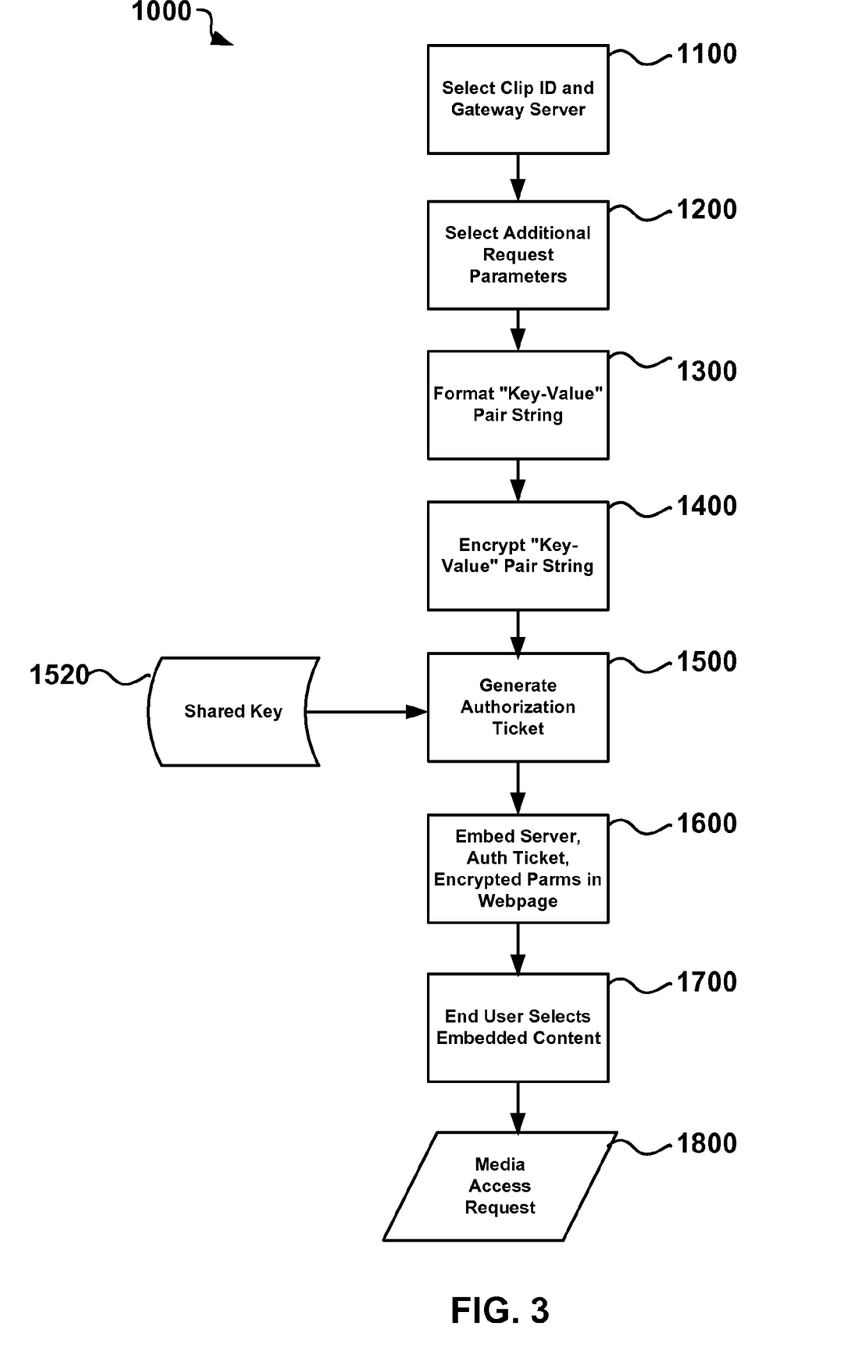
FIG. 3 illustrates one embodiment of a method for a website to securely request access to a media clip.

FIG. 3 illustrates one embodiment of a method 1000 for a website to securely request access to a media clip. Assume a website author wants to directly embed content on a website page, but does not wish the content to be viewable on external pages. The website author first selects a clip ID and a gateway server 1100. The author then selects additional request parameters 1200 for the request, which can include, without limitation, physical parameters such as bit-rate, and security options such as those discussed in greater detail below.

The request parameters are then formatted into a string which contains "key-value" pairs 1300, such as, for example, "clipID=12346789", each pair containing a keyword referring to a request option and the corresponding value. The "key-value" pairs can be concatenated into a single string separated by a standard delimiter such as a comma. The request parameter string is then encrypted 1400. The encrypted request parameter string is then used to generate an authorization ticket 1500 by, for example, generating an MD5 signature using the string, and optionally, a key 1520 shared with the selected gateway server. The selected gateway server, authorization ticket, and encrypted request parameters are embedded in a webpage, 1600. When the embedded content is selected by an end user 1700, authorization ticket, and encrypted web parameters, along with the referring page and the end user's IP address are transmitted 1800 to the selected gateway server.

In one embodiment, selected gateway server, authorization ticket, and encrypted request parameters can be embedded in a webpage as follows:

```
<embed
src='http://gateway.bcst.yahoo.com/getMedia.php?
authtype=v1&
auth=12f6bb1941df66b8f138a446d4e8670c&
enc_data=ra4X9vPQ2UXi3t8ajwKfS9X9vPQ2UXi3ajwKfS9X9vt8a'
type='application/x-ms-wmp'
/>
```

The 'src' parameter selects a getMedia script on a gateway server. The 'auth' parameter specifies an authentication ticket for the request. The 'authtype' parameter indicates how the authentication ticket in the 'auth' parameter was generated. The type parameter specifies the application on an end user system to be used in viewing the selected media clip.

The 'enc_data' parameter contains an encrypted version of a string containing request parameters. This data can be formatted as a string containing a set of key-value pairs. The key-value pairs within the "key-value pairs" string must include, at a minimum, sufficient information to identify and locate the specific content requested, for example: the data can include the following parameters:

clipID: specifies the content to be viewed (i.e. a news clip.).
The following parameters can be additionally used to enable the gateway servers to select a specific stream Id (a physical data stream with specific properties) containing the requested clip.
bitRates: specific transmission bit rate
formats: specific formats viewable by the end user
bandwidth: specifies the speed of the users connection
playerType: specifies the type of media player
secRules: specifies security rules to use in selecting the streamId
streamID: specifies a specific data stream to be viewed; can be provided if clip Id not given.

In one embodiment, the key-value data string can encrypted by calling a function, Encrypt ("key-value pairs", "encryption key") where 'Encrypt' is a symmetric encryption function which uses a string "encryption key" as the encryption/decryption key. The encryption/decryption key can be a secret key shared between the website provider and the gateway server. The request data string need not be encrypted, however, encryption of the string can enhance security by concealing request parameters which the website provider wishes to remain confidential.

In one embodiment, the authentication ticket 'auth' can be generated by, for example, MD5 ("data:secret key") where 'MD5' is a function which generates an MD5 signature from a string, 'data' is the encrypted string specified in enc_data. and the 'secret key' is a string selected by the website and shared with the gateway server. The IP address of the user system can additionally be used in generating the authentication ticket, for example, if the 'authtype' specifies a method that requires the use of the IP address of the end user system.

Figure 4:
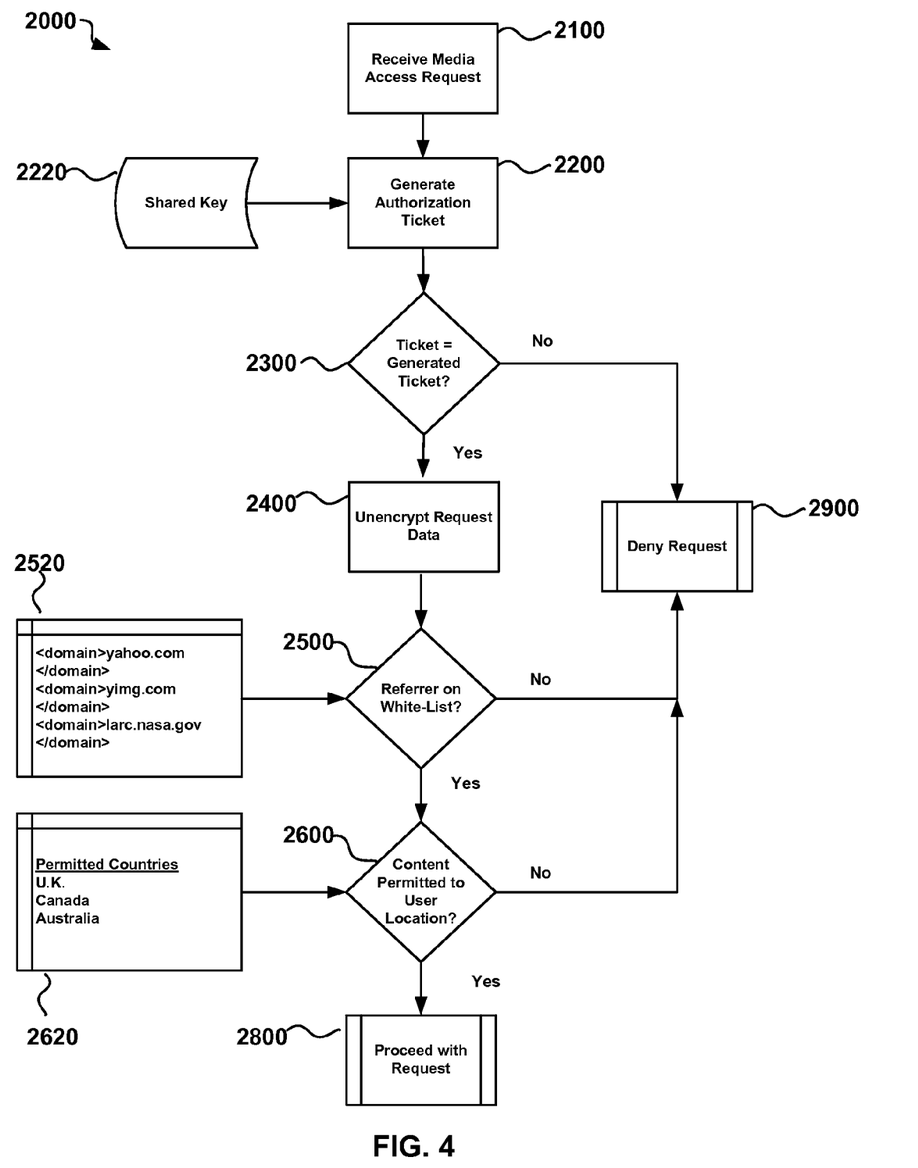
FIG. 4 illustrates one embodiment of a method for a gateway server to validate a request for access to a media clip.

FIG. 4 illustrates one embodiment of a method 2000 for a gateway server to validate a request for access to a media clip where the request includes an authorization ticket, an authorization ticket generation method, encrypted request parameters, the identity of the referring web page, and the end user's IP address. When such a request is received on a gateway server 2100, an authorization ticket is generated 2200 using the authorization ticket generation method, the encrypted request parameters, and a secret key shared with the website provider 2220, and, optionally, the end user system's IP address.

The authorization ticket generated by the gateway server is compared with the authorization ticket on the received request 2300. If the two authentication tickets do not match, the request is denied 2900. If the authentication ticket on the request matches the authentication ticket generated by the gateway server, the encrypted request parameters are uncrypted 2400. The referring website is checked 2500 to insure the website resides on the white-list 2520 for the content requested. Finally, the IP address of the requesting end user is checked 2600 against a geographical limitation list 2620 to determine if the user is in a geographical area that should not have access to the requested media. If the request passes all validations, it is allowed 2800, otherwise, it is denied 2900.

Figure 5:
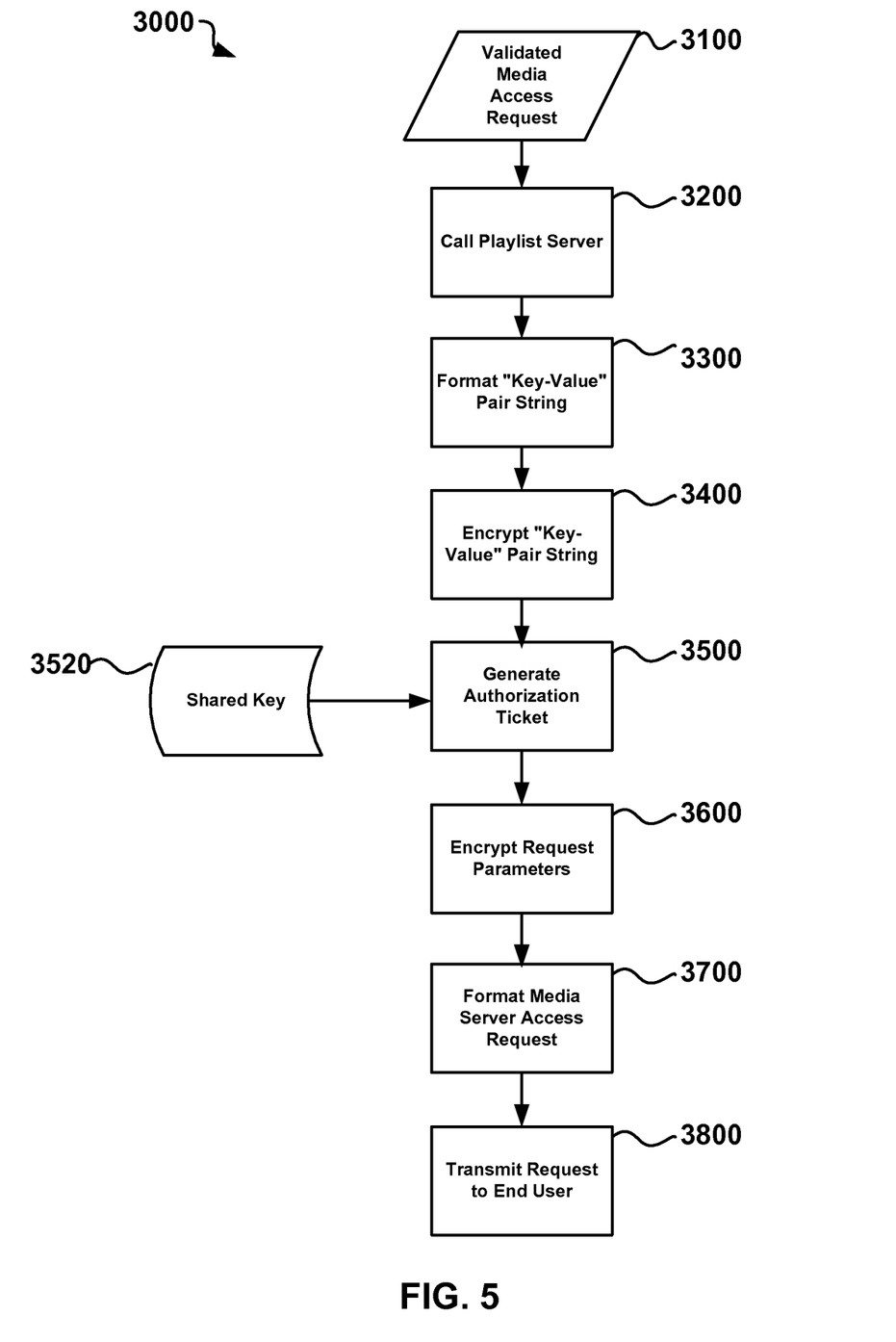
FIG. 5 illustrates one embodiment of a method for a gateway server to generate a media server request using a validated request for access to a media clip.

If the request is valid, the gateway server generates a media server request that contains information which can enable an end user system to access one or more media clips or other assets on a media server. FIG. 5 illustrates one embodiment of a method 3000 for a gateway server to generate a media server request using a validated request for access to a media clip 3100. The gateway server (such as, for example, an advertising server) makes an internal call 3200 to a playlist server, passing the selected media clip or file ID and, optionally, the IP address of the requesting user to the playlist server. The playlist server maps the request to a stream ID on a specific media server (or group of media servers) 3300 and returns a the location of the stream ID to the gateway server 3400. The gateway server selects additional security options for the request 3400, for example, specifying the authorization ticket is a one-time ticket.

The gateway server then generates an authorization ticket for a media server request 3500 using substantially all parameters applicable to the request (i.e. file name, security parameters, and so forth. By doing so, request parameters are protected from addition, deletion or modification after the request is generated. In one embodiment, the gateway server can generate an authentication ticket by concatenating a sorted list of key=value strings corresponding to data passed in the media server request along with a secret key shared between the gateway servers 3520 and media servers and generating an MD5 signature using the resulting string.

Parameters to be placed in a media server request can additionally be encrypted 3600 so that they do not expose internal details of a media server. For example the path and name of the file on a media server can be encrypted. Some parameters can be remain in unencrypted form where, for example, parameters are used in matching entries in different log files or parameters which are used as beacons for statistics. Finally, the gateway server formats a media server access request 3700 and transmits it to the requesting user 3800.

In one embodiment, the media server request can comprise a direct URL for a media server. For example:
mms://ms001.dal.bcst.yahoo.com/pp01/path/
    file.wmv?sid=4837722&auth=ab3ux8& . . . .

In the example above, the URL contains a stream ID 'sid' and an authorization ticket which a media server can use to validate the request. In the case where the request originated with a media player on an end user system, the response can be presented in a different format suitable for the media player to be able to understand that the player is being redirected to another URL.

Figure 6:
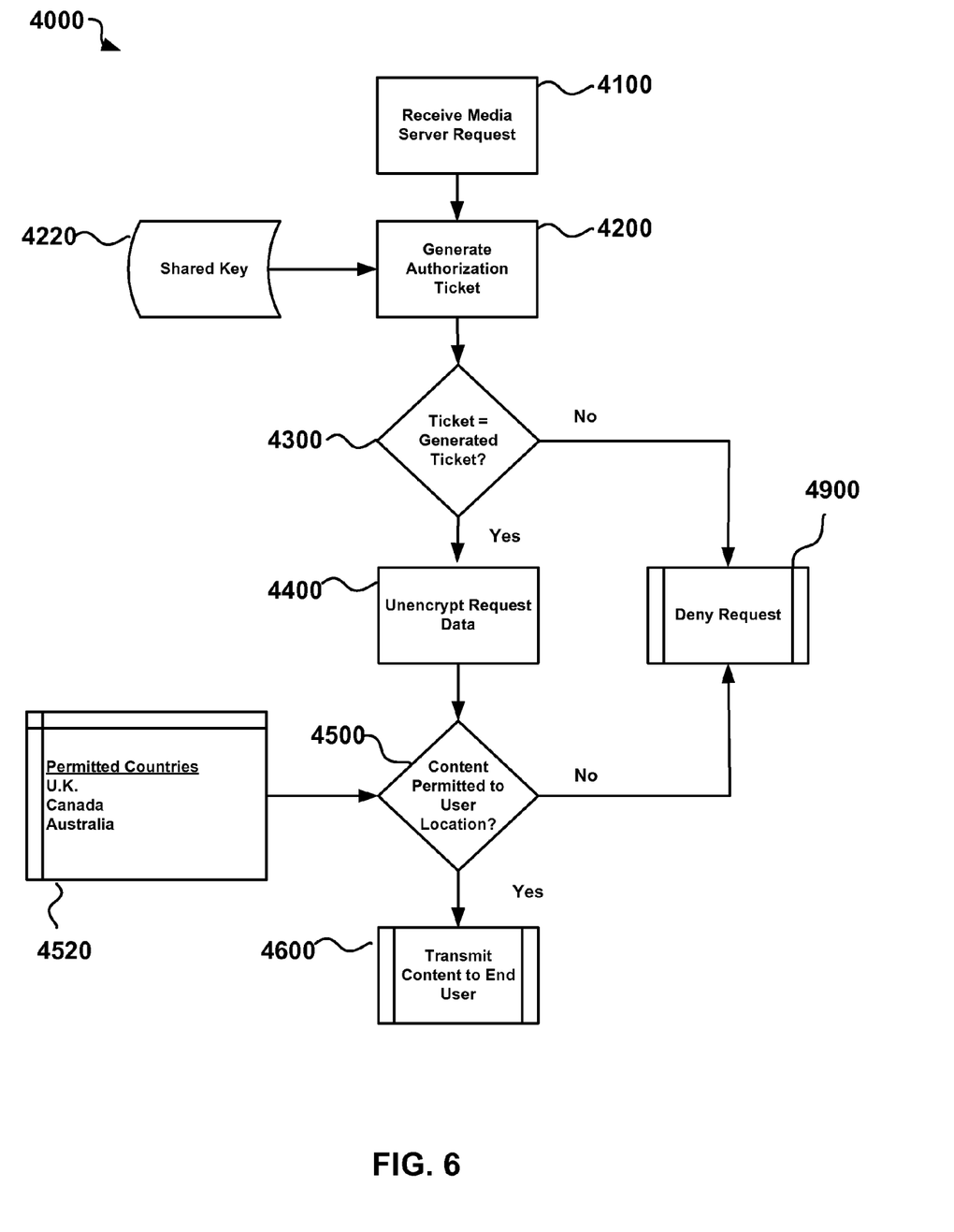
FIG. 6 illustrates one embodiment of a method for a media server to process a media server request.

When a requesting end user system receives a media server request, the end user can then transmit the request to the designated media server to obtain access to the desired content. FIG. 6 illustrates one embodiment of a method 4000 for a media server to process a media server request where the request includes an authorization ticket, an authorization ticket generation method, encrypted request parameters and the end user's IP address. When such a request is received on a media server 4100, an authorization ticket is generated 4200 using the authorization ticket generation method, the encrypted request parameters, and a secret key shared with the media server 4220, and, optionally, the end user system's IP address.

The authorization ticket generated by the gateway server is compared with the authorization ticket on the received request 4300. If the two authentication tickets do not match, the request is denied 4900. If the authentication ticket on the request matches the authentication ticket generated by the gateway server, the encrypted request parameters are uncrypted 4400. The IP address of the requesting end user is checked 4500 against a geographical limitation list 4500 to determine if the user is in a geographical area that should not have access to the requested media. If the request passes all validations, the requested media is transmitted to the requesting end user 4600, otherwise, the request is denied 4900.

When a gateway server creates a valid media server access request such as a URL for a media clip or file on a media server, there is nothing to prevent an end user system from reusing the same URL to attempt to retrieve the media clip multiple times. If security restrictions relating to the media clip have changed such that the content should no longer be accessible by an end user, the end user can attempt to bypass security restrictions by reusing a URL for the clip generated at an earlier time. For example, if content originally available to all users changes such that it should only be available to premium users, non-premium users who have previously accessed the content can attempt to continue to access the content using a URL generated at an earlier time. Furthermore, the URL can be transferred without the provider's consent to users who do not have access to the content, for example, a URL for content which can only be shown in the UK can be emailed to someone in the US.

Various methods can be used to prevent a URL or other request for media content from being used multiple times or by an unauthorized user. In one embodiment, an authentication ticket can be time limited simply by, for example, including a future time stamp as one of the key-value parameters of the signature and passing it to the media server. For additional security, the timestamp value can be encrypted to conceal how long the ticket is valid before generating the signature. The authentication ticket can additionally be made to be non-transferable by including a browser cookie, if available, or the IP address of the requester as one of key-value parameters used in the signature. If an IP address is used, for example, the IP address seen at the gateway and at the media server will remain the same. Where a requester is going through a proxy server, the IP address of the original requester provided by the proxy can be used (for example, in the HTTP_X_FORWARD_FOR header.)

The ticket can be restricted to one-time use by making the future timestamp very unique and including the IP address of the media server in generating the signature. The timestamp can be made unique by appending a random number to the original timestamp. The media server can deny the access request if the timestamp is in the past or if the timestamp is found in a table of timestamps which have already been seen. The entries in the table of timestamps can be deleted once the timestamp has expired. The response from the gateway server can additionally provide an "Expires" and "Cache-Control" header so that the redirect response does not get cached and the gateway server is called each time content is accessed.

When geographical restrictions are placed on content, the IP address of the end user system can be checked at the gateway server and at the media server before processing a request. It is possible, however, for end users outside of the authorized area to use a proxy server with an IP address within an authorized area. When a request is received from a proxy server, the IP address of the originator can be checked in addition to the IP address of the requester, for example, by using HTTP_X_FORWARD_FOR header on the HTTP request. Requests coming from a proxy server that does not forward the IP address of the request originator can be denied.

Enhanced security features, such as those discussed above, can be implemented using, in part, additional parameters within requests issued by end users or website providers to gateway servers for access to media clips. For example, the key-value pairs within the request data can provide parameters for additional security features. The data can include the following parameters which control the behavior of the gateway servers and the media servers:

reqHeaderCheck: require valid referrer headers at both the gateway and media servers
reqGeoCheck: require geographical restrictions at gateway servers
reqOneTimeToken: require valid one-time-token at media servers
reqSessionLimit: require a limit on the maximum number of simultaneous user sessions on media servers
reqTimeLimit: require time limits at both gateway and media servers
reqTimeLimitGW: require time limits at gateway servers
reqTimeLimitMS: require time limits at media servers The key-value pairs can also provide data which further qualifies the behavior of enhanced security features. The parameters can include.
authHash: an MD5 hash string used to authenticate the request
serverLimit: set to 1 if the media server IP is to be included in the 'auth' check
geoList: name of the geographic limitations list to use for IP checking timeLimit: timestamp after which time this request is not valid
timeBegin: a timestamp before which time this request is not valid
userLimit: set to 1 if the IP or cookie is to be included in the 'auth' check
userRealmId: an identifier for the end user; can be used to limit one-user to a single instance of one media stream
userSessions: maximum simultaneous sessions a user can have
whiteList: the name of the white list to use for header checking Enhanced security features can also be implemented in the media server access requests, for example, direct URLs, generated by a gateway server in response to a request from an end user for access to a media clip. For example, the data can include the following parameters which control the behavior of media servers:

reqOneTimeToken: require valid one-time-token at the media server
reqTimeLimit: require time limits at both the media server
reqHeaderCheck: require valid headers at the media server
reqGeoCheck: require geo-restrictions at the gateway server The URL can also provide data that further qualifies additional security features. Such parameters can include.
account: this indicates the account that owns the streamId; it can be used, for example, to determine the white list to use
authType: type of authorization scheme to use
authHash: an MD5 hash string used to authenticate the request
enc_sec (e_s): decrypted value should be "secret"
geoList: the name of the geographic limitations list to use for IP checking
filepath: the path and filename of the media content file
ott: a one-time-token (can only be used once).
timeLimit: a timestamp after which time this request is not valid
timeBegin: a unix timestamp before which time this request is not valid.
whiteList: the name of the white list to use for header checking.

Gateway and media servers can be additionally configured to implement freely configurable security rules which allow different security parameters to be specified for different data providers. For example some divisions of a provider or partners of a provider can choose to make content available to all users as long as a valid authentication ticket is provided, while other divisions or partners can require that all or some high quality content is only available to users who have subscribed to premium services. In one embodiment, the system can provide security rules that:

1—require user to be signed into a valid account with the provider
2—require user to be signed in with a partner site, for example, partner site can specify 'userId' in request)
3—require the user to be a subscriber, for example 'subscriberUrl' provides a link where user credentials are sent for validation before access to content; 'subscriberData' can specifies what data needs to be sent to this URL
4—specifies that a signed can only view one stream simultaneously; for example 'oneStreamUrl' provides a link to where user credentials and selected media server is sent; 'oneStreamData' specifies what data needs to be sent the URL; 'oneStreamCheck' specifies whether the one stream check should be done before or after access to requested content 5—require an authorization ticket at the gateway; 'authType' specifies how to interpret the auth ticket; for example "crumb" means to interpret the auth ticket as a crumb in a end user cookie 6—require a valid referrer; 'whiteList' provides the name of the white-list to use; if 'whiteList' is not specified, a default while list is used; in the white-list a "-" can means no referrer is given 7—require user IP address to be in a specified geographical location (based on countries and continents); 'geoList' specifies the name of the geographical list to use 8—require one-time-token at the media server The system can further categorize end users as follows:

U—user is unknown; has not signed in; checked at gateway server

Y—user is signed in; has valid Y and T cookies; checked at gateway server

P—user is signed in through Partner site; checked at gateway server

L—user is logged in either through Yahoo or Partner site; checked at gateway server.

S—user is a subscriber; is logged in and is a subscribed user; checked at gateway server O—one user one stream; checked at gateway server; enforced at media server A—user has provided a valid auth ticket; checked at gateway server R—user has a valid referrer; checked at gateway server. and media server G—user is in specified geographical location; checked at media server T—user has a valid one-time-token; checked at media server The system can then restrict access to media server assets using the above categories. For example, access attributes can be used to define content security rules based on bit-rate and format. For example:

*:*:A,R

The first field define the bit-rate, the second field defines the format and the third define the access attributes. This example specifies that for all bit-rates (*) and all formats (*) a valid authorization ticket (A) and a valid referrer (R) are required.

In another example:

*:*:U
*:wmv:R

All bit-rates (*) and all formats (*) are available to any user (U), except wmv content (*.wmv), which requires a valid referrer (R).

In another example:

*:*:A,R
>300:*:Y

For all bit-rates (*) and all formats (*), a valid authorization ticket (A) and a valid referrer (R) are required, and additionally, for content with a bit-rate greater than 300, the user must be signed into a providers web service.

In another example:

*:*:R
*:wmv:A|Y
300-500:flv:Y,O
>500:flv:S,O

This example specifies that for all bit-rates (*) and all formats (*), a valid referrer (R) is required. Additionally, wmv content also requires a valid authorization ticket or the user must be signed into a providers web service. Additionally, for flv content between 300 to 500 bit-rate the user must be signed into a provider's web service and can only consume one simultaneous stream per user account, and for flv content greater than 500 bit-rate the user must be a subscriber and can only consume one simultaneous stream per user account.

A security rule specification can be formatted as an XML document such as:

```
<security>
    <whiteList>finance</whiteList>
    <authType>crumb</authType>
    <subscriberUrl>http://finance.yahoo.com:4080/checkSubscriber.php
    </subscriberUrl>
    <subscriberData>u=userId</subscriberData>
    <oneStreamUrl>http://finance.yahoo.com:4080/checkOneStream.php
    </oneStreamUrl>
    <oneStreamData>u=userId&mediaServer=mediaServer
    </oneStreamData>
    <oneStreamCheck>after</oneStreamCheck>
    <rules>
        <rule>*:*:A,R</rule>
        <rule>>300:*:S</rule>
    </rules>
</security>
```

If no security rules are provided for the account, then a default system rule can be used, for example

*:*:R,T

Which specifies that for all bit-rates (*) and all formats (*), a valid referrer (R) and a valid one-time timestamp (T) are required.

Where a <whiteList> is specified, in one embodiment, white-list can be defined as follows:

```
<deny>
    <agentList>
        <agent>RealPlayer</agent>
    </agentList>
</deny>
<allow>
    <domainList>
        <domain>yahoo.com</domain>
        <domain>yimg.com</domain>
        <domain>larc.nasa.gov</domain>
        <domain>-</domain>
    </domainList>
</allow>
<allow>
    <domainList>
        <domain>go.yahoo.com</domain>
    </domainList>
    <agentList>
        <agent>Verizon</agent>
    </agentList>
</allow>
<default>deny</default>
```

This list contains sections that define 'allow' and 'deny' rules. In one embodiment, the list is processed from top to bottom and the first rule that matches determines if the request will be allowed or denied. In this example, the first rule will deny access if the 'agent' contains the string "RealPlayer". The second rule will allow access if the 'referrer' domain ends with either "yahoo.com", "yimg.com", "larc.nasa.gov" or "-" (referrer was not given). The third rule will allow access if the 'referrer' domain ends with "go.yahoo.com" and the 'agent' contains "Verizon". The fourth rule establishes the default policy to deny access. When matching 'referrer' domains, in this example, the domain checked to if it ends with a particular string.

If a request is denied because the referrer is not in the white-list, commonly, it will be the case that an author of a web page has attempted to link to a providers content directly. If the content returned is displayed the viewer of the web page, then it can display a message such as "to view this video please go to music.yahoo.com". When the author of the web page discovers that the content is not accessible, the author can remove the reference to the content from web page. As a result, the provider can lose the opportunity to increase the number of users viewing the content. If the content is available through an authorized provider channel, the content returned by the gateway server can inform the author about the approved channel. Thus if the content returned is addressed to the author it can display: "to add videos to your page go to add.music.yahoo.com". The author is thereby made aware of the fact the content can be displayed using an authorized channel.

Figure 7:
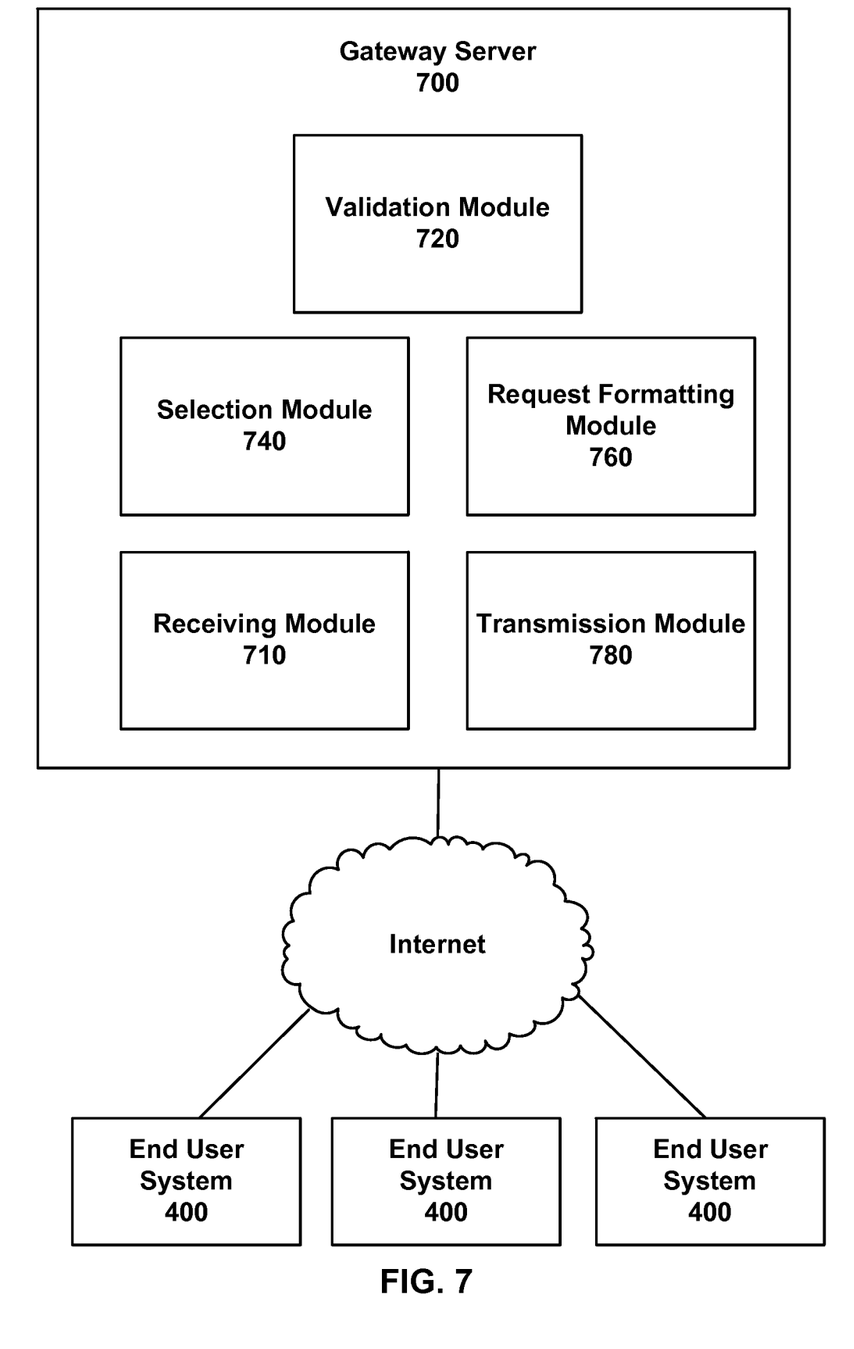
FIG. 7 illustrates one embodiment of a gateway server.

FIG. 7 illustrates one embodiment of a gateway server 700 capable of carrying out the methods disclosed above. The gateway server is accessible to end user systems 200 through an external network, for example, the Internet. A receiving module 710 receives requests for access to secured data resource from end users, the request comprising an authorization ticket and a referring website. After receiving a request for data from the end user, validation module 720 validates the authorization ticket and validates the referring website, and can perform additional validation steps including, without limitation, verifying the referring website is on a white-list and verifying users from the requesting user's geographical location are allowed to access the secured data resource.

After the request is validated, a selection module 740 selects a data server to service the request, a request formatting module 760 formats a data server access request which includes a data server location and data server request parameter data including, at a minimum, an identifier for the secured data resource. The data server request can be formatted to contain additional parameters such as an authorization ticket, an indication that the authorization ticket is time limited, or an indication that the authorization ticket is a one-time ticket. After the data server access request is formatted, a transmission module 780 transmits the data server access request to the end user.

Figure 8:
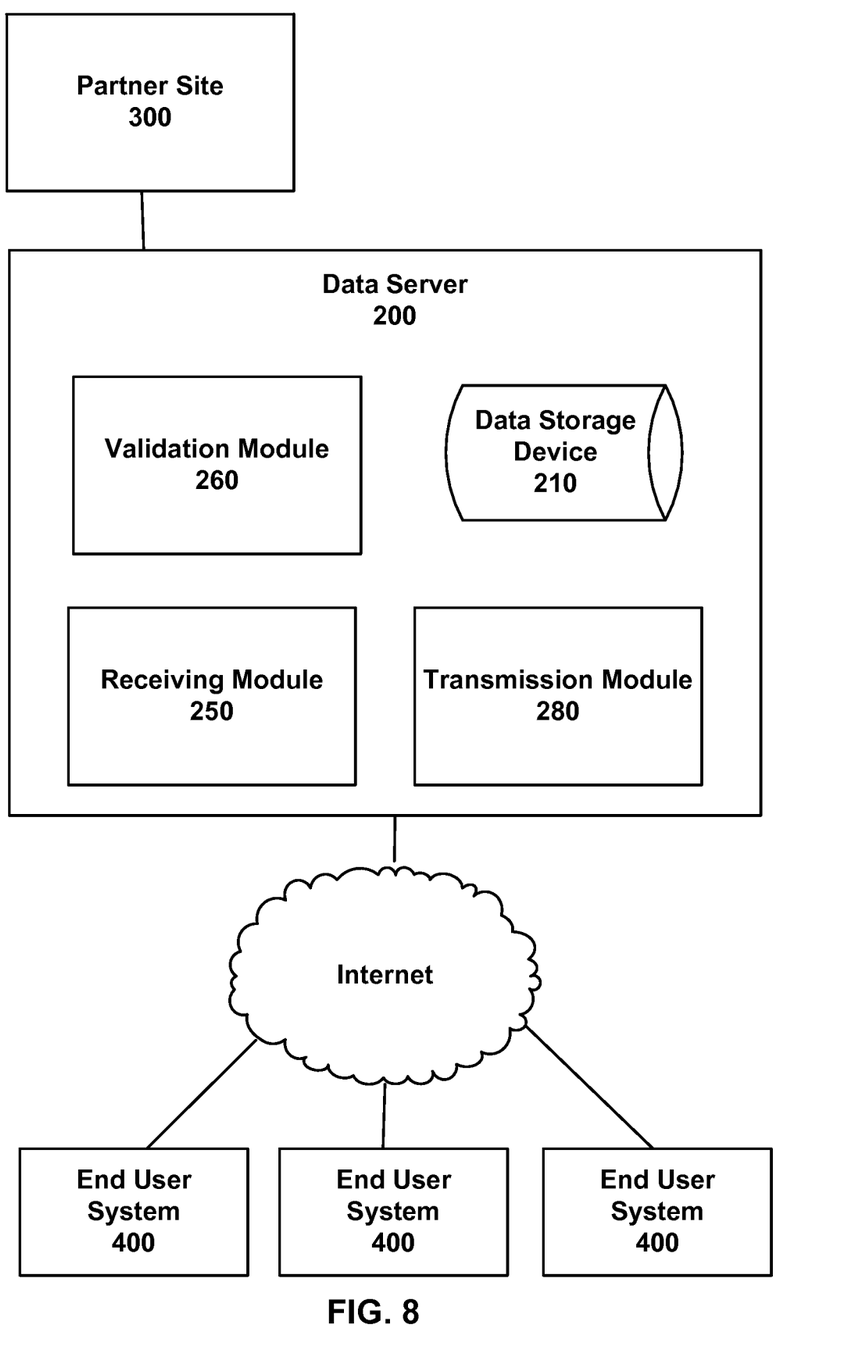
FIG. 8 illustrates one embodiment of a media or data server

FIG. 8 illustrates one embodiment of a media or data server 200 capable of carrying out the methods disclosed above. The data server is accessible to end user systems 200 through an external network, for example, the Internet. A receiving module 250 receives data server access requests that request the delivery of a secured data resource that resides on a storage device 210 at the provider's site or at a site 300 of a partner of the provider. The storage device 210 may be integral to the server, or alternatively, represent a physically separate storage device.

The data server access request can contain an authorization ticket and additional access or security parameters such an indication that the authorization ticket is time limited, or an indication that the authorization ticket is a one-time ticket. After a request is received, a validation module 260 validates the authorization ticket, if one is present, and enforces the any additional security or access parameters included on the request. After the request is validated, a transmission 280 module transmits the secured data server resource to the end user.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

We claim:

1. A method comprising the steps of:
   receiving, by a processor, a request for access to a selected, secured data resource comprising a media item from an end user device, the request comprising an authorization ticket generated by a referring website that facilitates the selection of the media item, the authorization ticket is generated using an identifier of the selected media item;
   validating, by the processor, the authorization ticket;
   validating, by the processor, the referring website;
   automatically selecting, by the processor, additional media clips to be transmitted to the end user device with the selected media item identified in the authorization ticket, the additional media clips not identified in the request;
   obtaining, by the processor from the authorization ticket, the identifier of the selected media item on the data server;
   selecting, by the processor, one or more data servers to service the request for access to the selected media item based on the identifier from the authorization ticket and respective identifiers of the additional media clips associated with the selected media item;
   generating, by the processor, a plurality of second authorization tickets using identifying information of the selected data servers wherein at least one of the second authorization tickets comprises the identifier of the selected media item on the data server obtained from the authorization ticket;
   formatting, by the processor, a plurality of data server access requests, the data server access requests comprising the second authorization tickets, data server locations and data server request parameter data wherein at least one of the data server access requests comprises the identifier for the selected media item; and
   transmitting, by the processor, the data server access requests to the end user device.

2. The method of claim 1 wherein the authorization ticket is validated using a secret key shared with the referring website.

3. The method of claim 2 wherein the authorization ticket is an MD5 signature.

4. The method of claim 1 wherein the referring website is validated by verifying that the referring website is on a white-list for the selected media item.

5. The method of claim 1 the second authorization ticket associated with the selected media item is generated using a secret key shared with a respective data server.

6. The method of claim 5 wherein respective data server request parameter data additionally comprise data that indicates the second authorization tickets are only valid for one use on the data servers.

7. The method of claim 5 wherein the respective request parameter data additionally comprises data that indicates the second authorization ticket associated with the selected media item is valid for a specified time interval, and additionally comprises data indicating the time the second authorization ticket was generated.

8. The method of claim 1 wherein the data server request parameter data is encrypted using a secret key shared with the data server.

9. The method of claim 1 wherein the request for access to a media item additionally comprises information indicating the geographic location of the end user device and the method comprises the additional steps of determining the geographic location of the end user device and verifying that an end user from that geographic location is permitted to access the selected media item.

10. The method of claim 1 comprising the additional steps of:
receiving the data server access requests from the end user device at the selected data servers;
the selected data servers validating the second authorization tickets;
the selected data servers transmitting the selected media item and the additional media clips associated with the selected media item to the end user device.

11. The method of claim 10 wherein the second authorization ticket associated with the selected media item is validated using a secret key shared with a gateway server.

12. The method of claim 11 wherein the second authorization ticket associated with the selected media item is an MD5 signature.

13. The method of claim 10 wherein the end user device additionally transmits the referring website to the selected data server transmitting the selected media item and the selected data server additionally validates the referring website.

14. The method of claim 13 wherein the referring website is validated by verifying that the referring website is on a white-list for the selected media item.

15. The method of claim 10 wherein the data server request parameter data additionally comprises data that indicates the second authorization ticket associated with the selected media item is only valid for one use on a data server and the selected data server verifies that the second authorization ticket has not been previously used.

16. The method of claim 10 wherein the request parameter data additionally comprises data that indicates the second authorization ticket associated with the selected media item is valid for a specified time interval, and additionally comprises data indicating the time the second authorization ticket was generated and the selected data server verifies that the second authorization ticket associated with the selected media item has not expired.

17. The method of claim 10 wherein the data server request parameter data is encrypted using a secret key shared with the data server.

18. The method of claim 1, wherein the additional media clips are advertisements.

19. A non-transitory computer-readable medium having computer-executable instructions for a method comprising the steps of:
receiving a request for access to a secured data resource comprising a media item from an end user device, the request comprising an authorization ticket generated by a referring website that facilitates selection of the media item, the authorization ticket is generated using an identifier of the selected media item;
validating the authorization ticket;
validating the referring website;
automatically selecting, additional media clips to be transmitted to the end user device with the selected media item, the additional media clips not identified in the request;
obtaining, by the processor from the authorization ticket, the identifier of the selected media item on the data server;
selecting one or more data servers to service the request for access to the selected media item based on the identifier from the authorization ticket and respective identifiers of the additional media clips associated with the media item;
generating, by the processor, a plurality of second authorization tickets that comprise identifying information of the selected data servers and at least one of the second authorization tickets comprises the identifier of the selected media item on the data server obtained from the authorization ticket;
formatting a plurality of data server access requests, the data server access requests comprising the second authorization tickets and data server locations, wherein the second authorization tickets includes data server request parameter data wherein at least one of the data server access requests comprises the identifier for the selected media item on the data server; and
transmitting the data server access requests to the end user.

20. The computer-readable medium of claim 19 wherein the authorization ticket is validated using a secret key shared with the referring website.

21. The computer-readable medium of claim 20 wherein the authorization ticket is an MD5 signature.

22. The computer-readable medium of claim 20 wherein the second authorization tickets are generated using at least a portion of the data server request parameter data and a secret key shared with the data servers.

23. The computer-readable medium of claim 22 wherein the data server request parameter data additionally comprises data that indicates the second authorization tickets are only valid for one use on the data servers.

24. The computer-readable medium of claim 23 comprising the additional steps of:
receiving at least one of the data server access requests from the end user at the selected data servers;
the selected data servers validating one or more of the second authorization tickets;
at least one of the selected data servers transmitting the selected media item to the end user.

25. The computer-readable medium of claim 24 wherein the second authorization tickets are validated using at least a secret key shared with a gateway server.

26. The computer-readable medium of claim 25 wherein at least one of the second authorization tickets is an MD5 signature.

27. The computer-readable medium of claim 24 wherein the end user additionally transmits the referring website to the selected data server and the selected data server additionally validates the referring website.

28. The computer-readable medium of claim 27 wherein the referring website is validated by verifying that the referring website is on a white-list for the secured data resource.

29. The computer-readable medium of claim 24 wherein the data server request parameter data additionally comprises data that indicates the second authorization tickets are only valid for one use on a data server and the selected data server verifies that the tickets have not been previously used.

30. The computer-readable medium of claim 24 wherein the request parameter data additionally comprises data that indicates the second authorization tickets are valid for a specified time interval, and additionally comprises data indicating the time the tickets were generated and the selected data servers verify that the ticket has not expired.

31. The computer-readable medium of claim 24 wherein the data server request parameter data is encrypted using a secret key shared with the data server.

32. The computer-readable medium of claim 22 wherein the request parameter data additionally comprises data that indicates the second authorization tickets are valid for a specified time interval, and additionally comprises data indicating the time the second authorization tickets were generated.

33. The computer-readable medium of claim 19 wherein the referring website is validated by verifying that the referring website is on a white-list for the secured data resource.

34. The computer-readable medium of claim 19 wherein the data server request parameter data is encrypted using a secret key shared with the data server.

35. The computer-readable medium of claim 19 wherein the request for access to the selected media item additionally comprises information indicating the geographic location of the end user and the method comprises the additional steps of determining the geographic location of the end user and verifying that an end user from that geographic location is permitted to access the selected media item.

36. A system comprising:
a gateway server operatively connected to an end user device, the gateway server comprising,
  a receiving module that receives a request for access to a selected, secured data resource comprising a media item from an end user, the request comprising an authorization ticket generated by a referring website that facilitates the selection of the media item, the authorization ticket is generated using an identifier of the selected media item,
  a validation module that validates the authorization ticket and the referring website,
  an association module that automatically selects additional media clips to be transmitted to the end user with the selected media item, the additional media clips not identified by the end user in the request,
  a selection module that selects one or more data servers to service the request for access to the media item based at least one on the identifier comprised within the authorization ticket and respective identifiers of the additional media clips associated with the selected media item,
  a request formatting module that formats a plurality of data server access requests, the data server access requests each comprising at least one of the second authorization tickets, identifying information of the selected data servers, data server locations and wherein at least one of the second authorization tickets comprises data server request parameter data comprising the identifier for the selected media item on the data server,
  a transmission module that transmits the data server access requests to the end user.

37. The system of claim 36 wherein the validation module validates the authorization ticket using a secret key shared with the referring website.

38. The system of claim 37 wherein the authorization ticket is an MD5 signature.

39. The system of claim 36 wherein the validation module validates the referring website by verifying that referring website is on a white-list for the secured data resource.

40. The system of claim 36 wherein the second authorization tickets are generated by the request formatting module using at least a portion of the data server request parameter data and a secret key shared with the data server.

41. The system of claim 40 wherein the data server request parameter data additionally comprises data that indicates the second authorization tickets are only valid for one use on a data server.

42. The system of claim 40 wherein the request parameter data additionally comprises data that indicates the second authorization tickets are valid for a specified time interval, and additionally comprises data indicating the time the second authorization tickets were generated.

43. The system of claim 40 wherein the selected data server is operatively connected to the end user and the selected data server further comprises,
  a second receiving module that receives the data server access request from the end user;
  a second validation module that validating at least one of the second authorization tickets; and
  a second transmission module that transmits the secured data server resource to the end user.

44. The system of claim 43 wherein the second authorization ticket associated with the selected media item is validated by the second validation module using a secret key shared with the gateway server.

45. The system of claim 44 wherein the at least one second authorization ticket is an MD5 signature.

46. The system of claim 43 wherein the end user additionally transmits the referring website to the selected data server and the second validation module additionally validates the referring website.

47. The system of claim 46 wherein the referring website is validated by the second validation module by verifying that the referring website is on a white-list for the secured data resource.

48. The system of claim 43 wherein the data server request parameter data additionally comprises data that indicates the second authorization tickets are only valid for one use on a data server and the second validation module verifies that the second authorization tickets have not been previously used.

49. The system of claim 43 wherein the request parameter data additionally comprises data that indicates the second authorization tickets are valid for a specified time interval, and additionally comprises data indicating the time the second authorization tickets were generated and the selected data server verifies that the second authorization tickets have not expired.

50. The system of claim 43 wherein the data server request parameter data is encrypted using a secret key shared with the data server.

51. The system of claim 36 wherein the data server request parameter data is encrypted by the request formatting module using a secret key shared with the data server.

52. The system of claim 36 wherein the request for access to a secured data resource additionally comprises information indicating the geographic location of the end user and the validation module additionally validates the geographic location of the end user by verifying that an end user from that geographic is permitted to access the secured data resource.

* * * * *